April 2, 1963 H. F. MOELLMANN 3,083,531
FUEL CONTROL DECELERATION SCHEDULING MECHANISM
Filed May 20, 1959 3 Sheets-Sheet 1

INVENTOR.
HEINZ F. MOELLMANN
BY
ATTORNEYS.

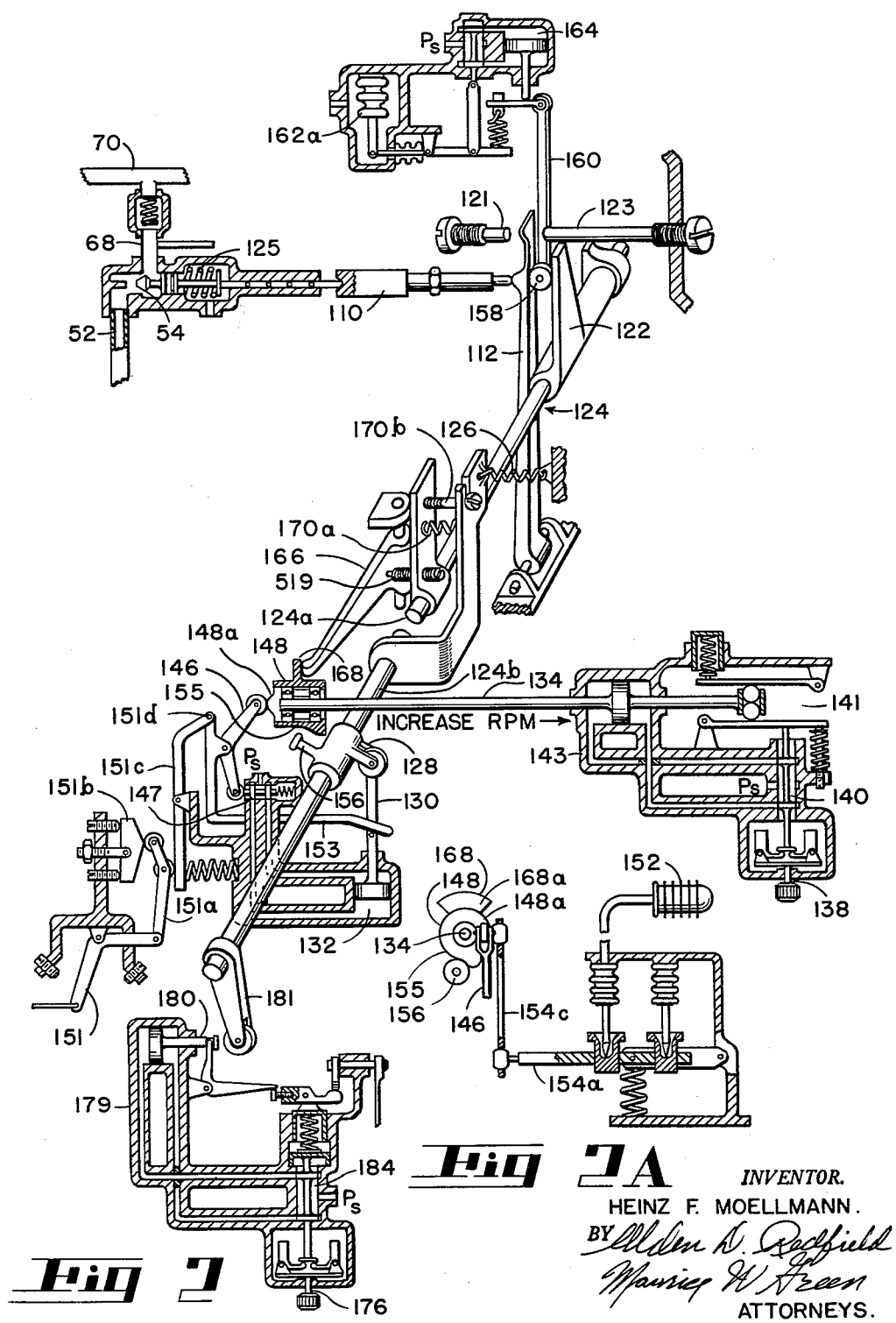

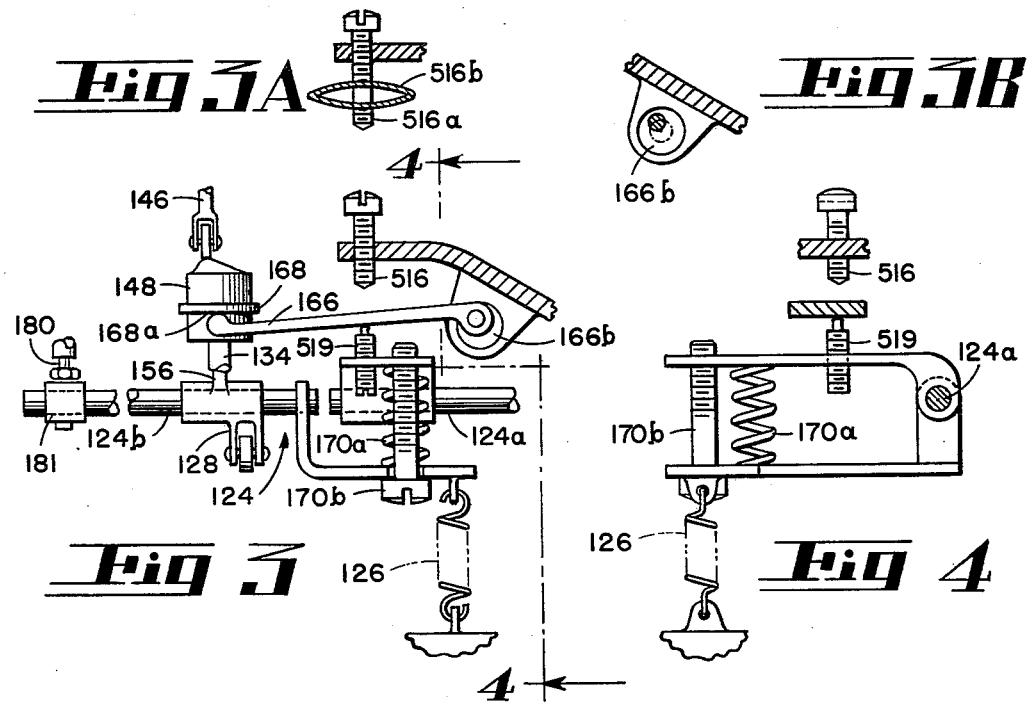

3,083,531
Patented Apr. 2, 1963

3,083,531
FUEL CONTROL DECELERATION SCHEDULING MECHANISM
Heinz F. Moellmann, Stratford, Conn., assignor to Avco Corporation, Lycoming Division, Stratford, Conn., a corporation of Delaware
Filed May 20, 1959, Ser. No. 814,548
7 Claims. (Cl. 60—39.28)

This invention relates to a fuel control deceleration scheduling mechanism for gas turbine engines, and is particularly related to mechanism provided for control of fuel flow for accomplishing satisfactory operation of the engine during deceleration. In fuel control mechanisms for gas turbine engines, it is important that under conditions requiring deceleration of the engine the rate of deceleration be scheduled in proper relationship to the various conditions of operation, so that such deceleration may be accomplished without engine failure.

It is a practice to schedule fuel flow for deceleration as a function of gas producer (turbine and compressor rotor) r.p.m. and the pressure of the air entering the inlet to the compressor. It is also sometimes considered important to include the effect of temperature in scheduling the rate of minimum fuel flow required during deceleration. It is therefore important that a mechanism providing automatic deceleration limitation under such a practice must consider including mechanism reflecting the gas producer speed of rotation and the air inlet pressure. Inasmuch as the mechanism for controlling fuel flow under normal operation is dependent on the positioning of stops moved by various controls which limit the normal tendency of the spring-urged mechanism to open the fuel metering valve, and since some of these controls might slow down the gas producer too fast if a deceleration schedule were not provided, it is therefore necessary to provide some mechanism for overriding the effect of these other controls in imposing the limiting schedule on deceleration. In certain prior art devices it has been found advantageous to provide resilient mechanism in certain of the mechanisms at their individual positions. However, in the invention herein disclosed, this necessity has been obviated by the provision of an overtravel connection at another point in the mechanism so that the multiplicity of overtravel connections is not necessary but is provided at one point only, thus accomplishing a result desired with only one mechanism rather than a plurality of mechanisms.

The above and other objects of the invention will appear more fully from the following more detailed description and from the accompanying drawings forming a part hereof, and wherein:

FIG. 2 and FIG. 2A are views in perspective and partly in section showing the fuel control of this invention, including mechanism for scheduling deceleration and its relationship to other parts of the control.

FIG. 3 is a top view of a section of the mechanism shown in FIG. 2 and shows the arrangement of the sectional rockshaft with resilient connection therebetween.

FIG. 3A is a modified form of the stop limiting the movement of the deceleration lever and providing fuel temperature compensation.

FIG. 3B is a showing of the eccentric mounting providing adjustment of the deceleration limiting lever.

FIG. 4 is a section taken on the line 4—4 of FIG. 3.

Figure 1:
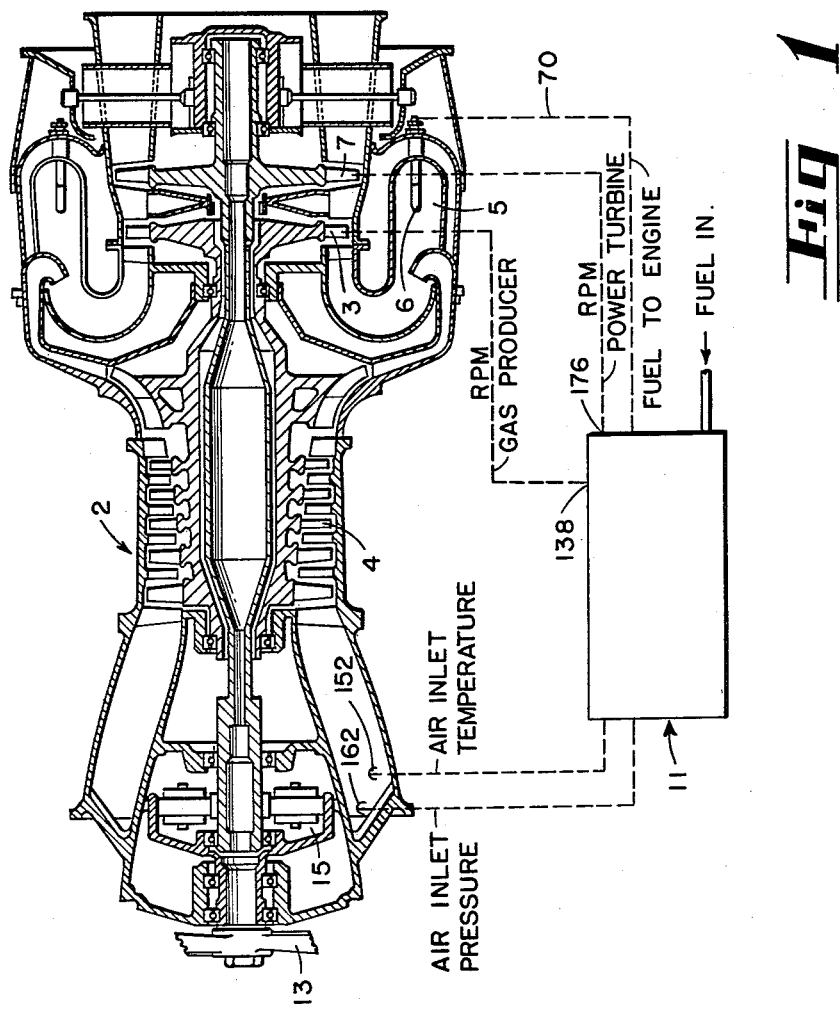
FIG. 1 is an illustration of a gas turbine engine with a schematic showing of the fuel control and its relationship to various parts of the engine.

Referring to FIG. 1:

A gas turbine power plant 2 employs a compressor driving turbine 3, sometimes called a "gas producer turbine," which drives air compressor 4 to furnish compressed air to an annular combustion chamber 5 to which fuel is supplied from nozzles 6 from fuel inlet 70. Turbine 3 and compressor 4 are sometimes individually and collectively referred to in the art as the gas producer portion of the gas turbine. Resultant hot gases from combustion and resultant flow thereof act to drive the power turbine 7 as well as the so-called gas producer turbine 3 in the power plant illustrated. The power turbine 7 (a so-called free-power turbine rotating independently) drives the propeller 13 through reduction gear 15 and suitable drive shaft. The fuel control is generally designated as 11 in FIG. 1.

Various parameters of engine operation are diagrammatically illustrated in FIG. 1 as imposing control for fuel flow variation on the fuel control 11. For instance, the r.p.m. of the gas producer turbine 3 is imposed at 138, which is indicated by like reference numeral in FIG. 2 of the drawings, and also the r.p.m. of the power turbine 7 is imposed at numeral 176 adjacent fuel control 11, which is also designated in FIG. 2 of the drawings. The air inlet temperature and the air inlet pressure are indicated by their elements at 152 for temperature and 162 for pressure in the inlet to the air compressor 4, and these numerals also refer to the corresponding elements similarly numbered in FIG. 2.

Referring to FIG. 2, a main metering valve 54 controls fuel flow by its longitudinal position of movement, thereby determining an orifice size and rate of flow for each position made possible by a regulated uniform pressure drop across the valve 54 by mechanism known in the art but not disclosed herein. Therefore the longitudinal position of member 110 determines the orifice size and amount of fuel flow to the engine. Fuel flows from source at 52 not detailed herein, metered through valve 54 to inlet 68, 70 to the engine.

The metering valve 54 is spring urged by spring 125 in a direction to the right as shown in the drawing, and therefore movement to the left is against this spring action, as shown, and a movement of the valve actuating member 110 to the right will increase fuel flow, and a movement in the opposite direction will decrease fuel flow. The various control movements to vary the flow of fuel are impressed upon this control member 110 by means of a rockshaft assembly 124, which by control contact with several levers, such as 181, 128 and 156 for power turbine r.p.m. and gas producer r.p.m., all projecting radially from the rockshaft 124, provide a linkage for the application of the various control parameters above enumerated, acting through the rockshaft, to position the actuating member 110 and thus to vary the orifice opening of the main metering valve 54.

The spring 126 and valve 54 urged by spring 125 tend to rotate the rockshaft clockwise and to open valve 54. Therefore the limitation opposing the clockwise rotation of rockshaft 124 will be imposed by the most outwardly projecting contact with a radial lever 181, 128 or 156, and the control which limits the movement of the valve toward open position to the greater extent (that is, the one calling for least fuel) will override others in its effect with the mechanical arrangement as provided.

It is necessary, for an understanding of the deleceration scheduling mechanism with which this invention is primarily concerned, to have a general understanding of the operation of the other portions of the control linkage which will cooperate to complete the mechanism controlling the schedule of deceleration. The variation of air inlet pressure is imposed on the rockshaft assembly by the link 160 which is moved as a function of air inlet pressure variation by a pressure responsive unit 162a which operates through a servo unit 164 to position the roller 158 between the parallel levers 112 and 122. A variation in leverage is thereby imposed in the movement of member 110. Maximum fuel stop 123 and minimum fuel stop 121 are provided, as shown. Such mechanism is disclosed in copending application Serial No. 814,519 filed May 20, 1959, and assigned to the same assignee as this application.

Likewise, the effect of the power turbine speed is imposed on the rockshaft through the radial lever 181 by servo mechanism 179, 180, 184 actuated through the power turbine responsive governor 176.

Gas producer speed of rotation actuates the governor 138, which through servo mechanism 140, 143 and linkage mechanism 141 actuates a longitudinal member 134, which is thereby positioned as a function of gas producer 3, 4, r.p.m. from governor 138. The rod 134 moves toward the right as shown in the drawing, as indicated by the arrow, for increasing r.p.m. of the gas producer 3, 4, and toward the left for decreasing r.p.m. This longitudinal movement acts on a linkage mechanism, making first contact therewith through lever 146, which in turn actuates servo mechanism 132 to act through member 130 upon projecting lever 128 to impose the gas producer speed control variation on the rockshaft 124 to increase or decrease the opening of the fuel metering valve in response thereto.

A more detailed description of the operation of the linkage (here designated generally as 146, 147), as well as the main power lever linkage mechanism (here generally designated as 151, 151a, 151b, 151c, 151d) and a feedback lever 153, is contained in copending application Serial No. 814,531, filed May 20, 1959, and assigned to the same assignee as the present invention.

A variation in temperature of the air entering the compressor is compensated for by so-called 3-D cam 148 rotatably mounted on the axis of the rod 134, as shown. The cam surfaces 148a and 155 of this cam compensate for temperature on varying rotated positions of this cam as controlled by a temperature unit (see FIG. 2A), with sensor 152, bellows 150, and linkage 154a, 154c, more fully set forth in copending application Serial No. 815,-520, filed May 20, 1959, and assigned to the same assignee as this invention, and will not be described in detail herein.

Assuming that deceleration is called for by some control tending to rotate the rockshaft 124 in a counterclockwise direction, such as a positioning of member 130 or 180, the result will be rotation of the rockshaft portion 124b counterclockwise; but the section 124b of the rockshaft, which is separated from the section 124a by a spring 170a, will not be allowed to follow that movement, inasmuch as a deceleration limiter 166 lever contacting projection 168 on the 3-D cam 148 will prevent such movement, and it is the overtravel allowed by the spring 170a between the two sections 124a and 124b of the rockshaft which provides this feature. Therefore the called-for closing of the metering valve 54 by any exceptional counterclockwise rotation of the rockshaft section 124b will not have the effect of closing the metering valve 54 any faster than will be allowed by a slowing up of the r.p.m. of the gas producer turbine, as the 3-D cam 148 carried by rod 134 moves as a function of gas producer r.p.m. This slowing up is that which will be accomplished by the initial closing movement of rockshaft section 124a allowed by the spacing of the stop 519 (see FIGS. 2 and 3) from the deceleration lever 166. Therefore, the result will be that the deceleration will be scheduled in an amount which is safe for the slowing up of the gas producer turbine. The stop 516 (see FIG. 3) is also provided which limits the minimum fuel flow allowed by a maximum movement of the deceleration lever 166. The effect of variation in inlet air pressure is imposed as a control-parameter in this deceleration control by the link 160, 158, 122, 112.

The mechanism for accomplishing the purpose of limiting deceleration as disclosed herein is a greatly simplified one over the prior art, and is accomplished by dividing the rockshaft 124 into two parts, a portion 124b for receiving impulses for reducing power, and a second portion 124a directly connected to actuate the fuel metering valve 54 with a resilient overtravel connection 170a between these two portions, 124b and 124a. A deceleration limiting lever 166 positioned to follow gas producer r.p.m., as previously described herein, is thus connected by abutment 519 to contact the portion 124a to limit its valve-closing movement as controlled by gas producer r.p.m. and will not allow the fuel metering valve to close at too fast a rate even though such closing may be asked for by the controls acting on the rockshaft portion 124b. The first section of the rockshaft 124a, modified by inlet pressure variation, is directly connected to actuate the fuel metering valve 54 as above discussed. However, the rockshaft section 124b is rotated by other engine controls and the resilient connection between the two sections 124a, 124b in normal steady-state operation and in acceleration carries through to provide unitary rotation between the two shaft sections; but such division of the shaft portions 124a, 124b and the resilient connection therebetween makes it possible to impose an independent limiting force on the first shaft section 124a to limit the effect of rotation of the second portion 124b as defined by gas producer rotative speed under deceleration conditions, thus assuring that the engine will not decelerate at too fast a rate.

The contacting projection 168, on which the deceleration limiting lever 166 acts, may be provided with a face cam 168a (see FIG. 3) which will allow for a variation in inlet temperature which is imposed on the system by the rotation of the 3-D cam 148. The temperature bias, above mentioned, is provided by the arcuate positioning of the 3-D cam 148 by the mechanism shown in FIG. 2A and as more completely described in the copending application, Serial No. 814,520, filed May 20, 1959, above mentioned.

As shown in FIG. 3, means of adjustment are provided which, in view of the arrangement of this mechanism, makes it possible to adapt a control system to the variations in requirements found in individual engines without major design changes in the mechanism. Such adjustments are afforded by an eccentric at the pivotally supported end of an eccentric bearing 166b. For instance, see FIG. 3B where the deceleration limiting lever 166 may in effect have its lever ratio modified by adjustment of the eccentric bearing 166b on lever 166. Further, an adjustment is afforded by the stop 516, which may be used to put a low limit, which is only modified by the pressure multiplier 164, on the deceleration fuel flow. A modification of the stop 516a is shown in FIG. 3A where a temperature sensitive element 516b is provided on the end of the stop 516a to afford a higher minimum allowable fuel flow for deceleration for the gas producer in cases where the fuel is cold which may be important at low engine speeds. The element 516b will be, in such cases, connected to be responsive to temperature of fuel fed to the engine, that is, the effective position of the stop 516a will be changed with fuel temperature. Also the adjusting screw 170b which acts as a positive connection between the rockshaft portions 124a and 124b for direction of rotation of the rockshaft causing increased fuel flow is provided. There is thus an adjustment between the two sections of the rockshaft to change the relative action of the control elements acting on the two shaft sections. Such an adjustment makes it possible to adjust the 3–D cam 148 movement relative to the mechanism varying with pressure as these mechanisms are on opposite sides of the overtravel spring 170a and adjustment 170b. It is thus apparent that the several adjustments which are made possible by the structure affords an effective means to provide several variations in the control system without redesign of the parts thereof.

Although the invention has been described by reference to a specific structure found practical in actual operation, it is understood that various modifications are intended without departing from the general principles and within the scope of the claims appended hereto. It is specifically to be mentioned that although the pressure and temperature of the inlet air to the compressor, or so-called gas producer, are here used to impose a compensating variation on the system, it is nevertheless intended that such pressure and temperature may be replaced by any other characteristic pressure and temperature in the engine, i.e., pressure and temperature in the combustion chamber or in the interstage compressor or tubine.

I claim:

1. In a fuel control for scheduling deceleration in a gas turbine engine having a gas producer with a compressor and a turbine to rotate the compressor, said fuel control comprising: a fuel metering valve, a rotatable sectional rockshaft having a first rockshaft section, means responsive to at least one parameter of engine operation for rotatably positioning said first rockshaft section, a second rockshaft section, and connections between said metering valve and said second rockshaft section controlling closing of said metering valve on rotative positioning of said second rockshaft section, a resilient overtravel connection between said first and second rockshaft sections normally actuable on rotation of said first section in a valve closing direction to transmit rotation to said second section to close said metering valve for deceleration of said engine but allowing limitation of rotation of said second section independent of said first section in a valve closing direction, a pivoted deceleration limiting lever adjacent said second rockshaft section positioned to contact said second section thereby to limit its rotation in valve closing direction, a movable member axially movable as a function of gas producer rotative speed and contacting said deceleration limiting lever limiting movement thereof in relation to decrease in speed of rotation of said gas producer, an abutment carried by said second rockshaft section and radially positioned from the axis of rotation of said second section affording spaced contact with said deceleration limiting lever to limit closing of said fuel metering valve as limited by the decrease in speed of rotation of said gas producer, and an adjustment for spacing said abutment relative to contact with said deceleration limiting lever to allow limited initial rotation of said second rockshaft section and to allow a limited closing movement of said metering valve prior to contact with said deceleration limiting lever.

2. A mechanism as in claim 1 wherein an adjustable bearing is provided with pivot for said pivoted deceleration limiting lever positioned eccentric relative to said bearing thereby effecting adjustment of the pivotal mounting of said lever.

3. A mechanism as in claim 1 wherein a stop is positioned to limit movement of said deceleration limiting lever in the direction toward reduced speed of rotation of said gas producer.

4. A mechanism as in claim 3 wherein a member responsive to fuel temperature is provided on said stop to vary the effective position of said stop with variation in fuel temperature.

5. A fuel control for scheduling deceleration in a gas turbine engine having a gas producer with a compressor and a turbine for rotating the compressor, a combustion chamber, a source of fuel under pressure, means for delivering fuel from said source to said combustion chamber, including a metering valve, said fuel control comprising: a movable member responsive to gas producer rotative speed, a first rotatable rockshaft section, a second rockshaft section rotatable to close said metering valve, a resilient overtravel connection between said first rockshaft section and said second rockshaft section normally transmitting rotative movement in a valve closing direction from said first section to said second section but allowing limited rotation of said second section independent of said first section in a valve closing direction, at least one engine control member contacting said first rockshaft section to rotatively position the same in a direction to close said metering valve to decelerate the engine, a deceleration limiting lever positioned to contact said movable member with said limiting lever thereby limited in its movement by said movable member responsive to gas producer rotative speed, said limiting lever also being positioned to contact said second rockshaft section thereby independently limiting rotation of said second rockshaft section to limit closing movement of said metering valve.

6. In a fuel control for scheduling deceleration in a gas turbine engine having a gas producer with a compressor and a turbine to rotate the compressor, said fuel control comprising: a fuel metering valve, a rotatable sectional rockshaft having a first rockshaft section, means responsive to at least one parameter of engine operation for rotatably positioning said first rockshaft section, a second rockshaft section, and connections between said metering valve and said second rockshaft section controlling closing of said metering valve on rotative positioning of said second rockshaft section, a resilient overtravel connection between said first and second rockshaft sections normally actuable on rotation of said first section to transmit rotation in a valve closing direction to said second section to close said metering valve for deceleration of said engine but allowing limitation of rotation of said second rockshaft section independent of said first rockshaft section in a valve closing direction, a pivoted deceleration limiting lever adjacent said second rockshaft section positioned to contact said second section thereby to limit its rotation in valve closing direction, a movable member axially movable as a function of gas producer rotative speed and contacting said deceleration limiting lever limiting movement thereof in relation to decrease in speed of rotation of said gas producer, an abutment carried by said second rockshaft section and radially positioned from the axis of rotation of said second section affording spaced contact with said deceleration limiting lever to limit closing of said fuel metering valve as limited by the decrease in speed of rotation of said gas producer.

7. In a fuel control for scheduling deceleration in a gas turbine engine having a gas producer with a compressor and a turbine to rotate the compressor, said fuel control comprising: a fuel metering valve, a rotatable first rockshaft section and means to rotatively position said section as a function of at least one parameter of engine operation and control, a second rotatable rockshaft section, and connections including said second rockshaft section to control the opening of said metering valve on rotative positioning of said second rockshaft section, a resilient overtravel connection between said first and second rockshaft sections normally transmitting rotational movement in a valve closing direction from said first rockshaft section to said second rockshaft section to close said metering valve to decelerate the engine but allowing rotation of said second rockshaft section to be limited in the direction closing said metering valve independent of the rotation of said first section, a deceleration limiting member adjacent said second rockshaft section and movable in relation to decrease in speed of rotation of said gas producer and spacedly positioned to contact said second rockshaft to limit closing rotation and thereby to limit closing of said fuel metering valve independently of the rotation of said first rockshaft section.

References Cited in the file of this patent

UNITED STATES PATENTS

| | | |
|---|---|---|
| 1,009,621 | Albert | Nov. 21, 1911 |
| 1,362,709 | Lee | Dec. 21, 1920 |
| 2,082,888 | Herard et al. | June 8, 1937 |
| 2,844,936 | Fowler et al. | July 29, 1958 |
| 2,857,739 | Wright | Oct. 28, 1958 |
| 2,957,488 | Farkas | Oct. 25, 1960 |
| 3,023,801 | Kinney | Mar. 6, 1962 |

FOREIGN PATENTS

| | | |
|---|---|---|
| 1,168,634 | France | Sept. 1, 1958 |
| 1,189,180 | France | Mar. 23, 1959 |